United States Patent [19]
Krikorian

[11] 3,764,660
[45] Oct. 9, 1973

[54] CHEMICAL PROCESSING IN GEOTHERMAL NUCLEAR CHIMNEY

[75] Inventor: Oscar H. Krikorian, Danville, Calif.

[73] Assignee: The United States of America as represented by the United States Atomic Energy Commission, Washington, D.C.

[22] Filed: May 17, 1971

[21] Appl. No.: 144,168

[52] U.S. Cl. .................................. 423/362, 176/39
[51] Int. Cl. ......................... C01c 1/04, G21c 19/28
[58] Field of Search ................. 23/198, 199, 1, 289;
423/362, 376; 260/449.5; 176/39

[56] References Cited
UNITED STATES PATENTS
3,404,919  10/1968  Dixon................................ 75/101 R
2,804,146  8/1957   Crawford............................. 23/1 R
1,704,214  3/1929   Richardson.......................... 23/199

OTHER PUBLICATIONS

Gilluly: "The Earth's Heat: A New Power Source," Science News, Vol. 98, Nov. 28, 1970, pp. 415–416

Primary Examiner—Oscar R. Vertiz
Assistant Examiner—Hoke S. Miller
Attorney—Roland A. Anderson

[57] ABSTRACT

A closed rubble filled nuclear chimney is provided in a subterranean geothermal formation by detonation of a nuclear explosive device therein, with reagent input and product output conduits connecting the chimney cavity with appropriate surface facilities. Such facilities will usually comprise reagent preparation, product recovery and recycle facilities. Processes are then conducted in the nuclear chimney which processes are facilitated by temperature, pressure, catalytic and other conditions existent or which are otherwise provided in the nuclear chimney.

8 Claims, 4 Drawing Figures

CHEMICAL PROCESSING IN GEOTHERMAL NUCLEAR CHIMNEY

BACKGROUND OF THE INVENTION

The invention disclosed herein was made under, or in the course of USAEC Contract No. W-7405-ENG-48 with the United States Atomic Energy Commission.

Proposals have been made heretofore relating to the use of nuclear explosives to produce rubble filled nuclear chimneys and associated fracture zones in subterranean geothermal formations to increase geothermal steam output or to distill seawater (c.f. "The Constructive Uses of Nuclear Explosives," Teller, Talley, Higgins and Johnson, McGraw-Hill Book Co., 1968, pp. 282, et seq. Moreover, as summarized beginning on page 279, of the aforesaid publication, proposals have been made to use nuclear detonations for underground retorting of various ores and chemical compounds, in non-geothermal environments. Such publication also sets forth various difficulties which stand in the way of the economics or feasibility of use as proposed heretofore, e.g., limitation of temperature to about 100° C if water is present and low thermal efficiency particularly if reaction rates are slow.

The potential rewards that would result from an effective means of utilizing nuclear explosives for chemical production are also mentioned therein. Geothermal steam has, of course, been used to generate power, e.g., in California, New Zealand, Iceland and Italy, for many years.

SUMMARY OF THE INVENTION

The present invention relates, generally, to procedures for conducting chemical reactions in underground reaction environments, and, more particularly, to the use of nuclear detonation cavities and chimneys provided in a subterranean geothermal formation as a reaction vessel for conducting chemical process reactions.

For operating a continuous process in accordance with the invention, there is first provided a nuclear detonation cavity with associated chimney in a subterranean geothermal formation. To adapt such chimney to serve as a reaction vessel, it is provided with a reagent input conduit generally communicating with lower portions of the chimney and a reaction product output conduit generally communicating with upper portions of the chimney. The nuclear chimney reaction vessel will generally include a rubble zone therein comprised of formation or other material in proximity to the nuclear explosive which is vaporized and melted and which is intermixed, at least partially, with fragments of the formation which cave therein. Facilities appropriate for producing reagents or otherwise for preparing reaction mixtures as well as for processing the reaction product are provided at the surface and are coupled to said input and output conduits, respectively. For a batchwise operation a single conduit may be used to alternately introduce reagents and withdraw products.

Reactions suitable for practice herein are those which are facilitated by the temperature, pressure, long contact times, and other conditions existent or provided in the chimney. The reagents may be in a solid, liquid or gaseous state but recovery of products may be more conveniently performed if in a vapor, gas or fluid form or can be converted to such a form. Moreover, the surface of the chimney contents may provide or may be treated to provide effective catalysis particularly in the presence of gamma and other ionizing radiation produced by the radioactive residues of the nuclear explosive which are distributed throughout the rubble zone. Catalytic agents may be provided in other ways, e.g., by disposing appropriate material in proximity to the nuclear device to be vaporized and interspersed with or to deposit upon rubble surfaces in a position where an effective catalytic state may be induced by contact with an appropriate fluidic or gaseous agent, or by equivalent means. In some instances effective catalysts can be provided by activating formation constituents.

For example, a nuclear chimney may be provided in mafic and ultramafic silicate rocks in a geothermal province which are in effective heat transfer reaction to a heated magmatic zone or otherwise so that a high temperature exists therein. Geothermal gradients of the order of 100°C or more per kilometer of depths are known. The initial geothermal temperature of the chimney contents may also be raised by the energy released and detonation of the explosive by as much as several hundred ° C dependent on emplacement depth as noted hereinafter. Accordingly, operating temperatures of the order of 350° C (673° K) or more can be achieved with nuclear explosive emplacement depths of as little as about 3 kilometers. Such temperatures are suitable for conducting a variety of chemical process reactions. At temperatures of above about 300° C with suitable pressures, reactions such as the reaction of hydrogen with nitrogen to produce ammonia proceeds at a significant rate in the presence of an effective catalyst. Other reactions or energy recovery may proceed at even lower temperatures. In accordance with the present invention such a gaseous reaction mixture, i.e., an $H_2$, $N_2$ mixture, is injected from a surface facility into the described nuclear chimney suitably preconditioned if necessary, to be heated and react therein to produce ammonia ($NH_3$) in the rubble zone. The process may be carried out in a continuous or in a batchwise fashion. Thereafter, the reaction mixture is discharged from the chimney through the output conduit and is treated in the surface facility to remove the ammonia and to recycle the residual reaction mixture. The heat provided by the nuclear explosive as well as that originally present as geothermal heat may accordingly be effectively employed.

Accordingly, it is a general object of the present invention to utilize a nuclear explosion chimney provided in a geothermal formation as a reaction chamber for conducting chemical process reactions therein.

Another object of the invention is to utilize a nuclear explosion chimney provided in a subterranean geothermal formation for conducting chemical process reactions therein.

Still another object of the invention is to utilize a nuclear explosion chimney provided in a subterranean formation for contacting reaction mixtures in the presence of catalytic surfaces provided on solid contents of a nuclear chimney created in a geothermal formation.

Other objects and advantageous features of the invention will be apparent in the following description taken together with the accompanying drawing, of which:

DETAILED DESCRIPTION OF THE INVENTION

Figure 1:
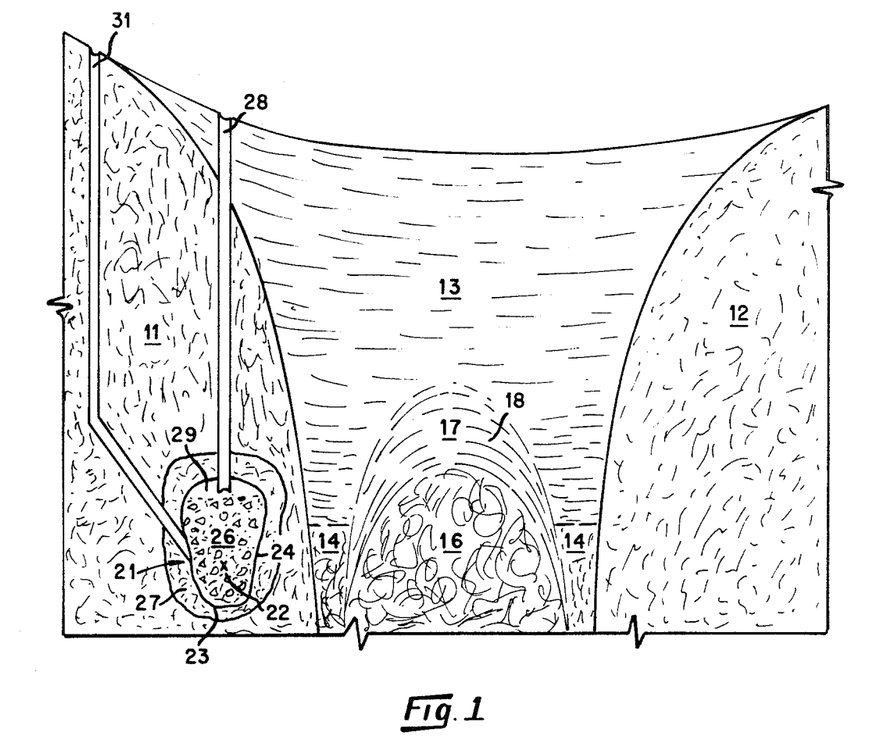
FIG. 1 is a vertical cross-sectional view of a typical geothermal formation having a nuclear chimney provided therein which is suitable for conducting chemical process reactions in accordance with the teachings of the invention.

Geothermal formations of a wide variety are described, for example, in Geological Survey Circular 519 entitled Geothermal Energy, published by the United States Geological Survey. A further description appears in Science News, Volume 98, Nov. 28, 1970, pps 415–416. For illustrative purposes, reference will be made hereinafter to a geothermal formation of the type set forth in the latter publication; however, operation of the present process is not limited thereto but may be conducted in subterranean geothermal formations generally and meeting appropriate criteria as discussed more fully hereinafter. For present purposes a geothermal formation may be considered to be one in which a geothermal gradient of above about twice and preferably as high as available, may exist. More specifically, a geothermal formation, as illustrated in FIG. 1 of the drawing may comprise granitoid bodies 11 and 12 disposed in spaced relation with upper portions therebetween occupied by accumulated sediments 13 (Quaternary and Tertiary age). The lowermost portions therebetween are occupied by a depressed granitoid block 14 through which a body 16 of high temperature magma of relatively young geologic has intruded upwardly into lower portions of the sediments 13. Intrusion of magma body 16 has created a generally hemispheroidal zone 17 of metamorphosed rock 18 between adjacent portions of magma body 16 and block 13. Temperatures in the magma body 16 may range from a few hundred degrees centigrade, e.g., 300° to above 1,000° to 1,600° C, i.e., well above the melting point so that the body may still be in a molten state. Temperatures in the granitoid bodies 11, 12 and 14 progressively decrease outwardly from magma body 16 providing the mentioned geothermal gradient.

The upper portion of the magmatic body may lie fairly close to the surface, e.g., 1,000 to 4,000 meters or deeper. While in average rock types a temperature gradient of about 1° C per 100 feet may exist, in areas of abnormally high heat flow, as in geothermal formations, e.g., in the vicinity of a magma body 16, the temperature gradient generally will exceed 2° C/100 feet and can be as much as 10° C per 100 feet or more. Rock with a temperature ranging from perhaps 100° C to as high as 600° C or more in proximity to the magma body can then exist in which a nuclear chimney may be created.

Several criteria may be used to select a suitable site in a geothermal formation in which to create a nuclear chimney reaction vessel for practice of the invention, as follows:

1. The site should be at a depth or position at which an appropriate temperature exists and deep enough to accommodate operating pressures, e.g., so that lithostatic or hydrostatic pressure is at least slightly in excess of process operating conditions to minimize leakage into the formation.

2. Where ingress of formation constituents or egress of reaction components are not desired, the site should be in a formation interval which is relatively impervious and adequately fracture free to prevent excessive leakage from the nuclear chimney or ingress of excessive water from the formation. In this case the impervious formation should generally be of sufficient thickness and areal extent to accommodate fractures that may be created by the nuclear detonation without leakage to pervious strata or the surface, i.e., 1 to 2 detonation cavity radii, Rc, greater on all sides than the expected chimney height or cavity and chimney radii. Otherwise, sealing or self-sealing of the cavity may be employed to minimize leakage. Moreover, provided that a suitable hydrostatic pressure exists or by adjusting operating pressure to balance the formation pressure, excessive ingress or egress of reactants or formation constituents is prevented.

3. The formation material in which the site is located should be substantially insoluble and chemically inert to the reagents employed when appropriate for the particular process. In other cases, however, components of the formation may serve as a reagent.

4. The composition of the formation may be selected to include materials which can exert or which can be treated to provide catalysts effective to promote desired reactions or even to provide reactants suitable for conducting process reactions. Similarly, the composition should not include materials which could potentially promote undesired side reactions or which might poison the desired catalysts in a fashion which cannot be offset.

Socalled "silicate" rock may generally provide relatively inert, impervious, competent rock formations having suitable compositions for conducting many reactions. Silicate rock composition ranges generally include crystalline and non-crystalline igneous rock, relatively dry, non-porous shale, sandstone and sediments which are high in silica and low or devoid of lime, dolomitic constituents, etc. Suitable igneous rock may include granitoid, basaltic, rhyolitic and other rocks having properties mentioned above. On the other hand, limestone, dolomite and sedimentary formations having reactable constituents could provide a suitable site where reaction with formation constituents is desired or can be tolerated.

For example, suitable sites may be found in the granitoid bodies 11, 12 and possibly block 14. Suitable sites may also be found in sediments 13; however, sediments often tend to be more porous, have excessive water content or include components which can react with water or reagents in the chimney or which provide pathways for undesired leakage of geothermal steam, etc. The metamorphosed zone 17 might likewise provide a suitable site provided that excessive leakage pathways do not exist especially, if those pathways can be sealed or if the reaction pressure is balanced against hydrostatic pressure, since such a zone may provide higher temperatures and possibly a high geothermal heat flow.

For descriptive purposes, reference will be made to the provision and use of a nuclear chimney reaction vessel 21 situated in granitoid body 11; however, it will be appreciated that a nuclear chimney provided in any other equivalent geothermal rock formation having a suitable rock composition and structure may be used. Such a nuclear chimney 21 may be created by emplacement and detonation of a nuclear explosive (not shown) at a shot point 22 by methods known in the art. Generally, a cased or uncased borehole is drilled and prepared and a nuclear explosive device disposed in a suitable canister, and having an attached firing cable is lowered to the shot point, the well bore is stemmed and the device is then detonated. Details relating to the emplacement and detonation of underground nuclear explosives to produce a fully contained explosion with consequent provision of a nuclear chimney 21 are disclosed, for example, in the aforesaid publication of Teller et al., pp. 80 et seq. (c.f. "Emplacement and Stemming of Nuclear Explosives for Plowshare Applications," by J. L. Cramer, "Proceedings of Symposium on Engineering with Nuclear Explosives," Jan. 14–16, 1970, Las Vegas, Nevada). Conventional nuclear explosives may be used. In the event that the selected site is at a temperature in excess of that tolerated by the nuclear explosive a refrigerated canister, precooling of the borehole, etc. will generally be advisable.

On detonation of the device of the order of 70 to 100 tons of rock (silicate) per kiloton of explosive yield is vaporized which on expansion produces a cavity having a radius, Rc, of which the generally hemispheroidal remnant portion 23 is shown in FIG. 1. Eventually about 700 tons of rock (silicate) is melted per kiloton of yield. After varying periods of time (a few minutes to several days) roof portions of the cavity collapse creating a generally cylindrical chimney 24 extending upwardly from the detonation cavity. The material which collapses creates a rubble zone 26 which may fill from about 50 to 90 percent of the void space and which may have a bulk porosity of the order of 25 to about 55 percent. Comprehensive details of the conditions and effects relevant to detonation of buried nuclear explosives are given in Report UCRL-50929 (TID-4500 UC-35) entitled "Aids for Estimating Effects of Underground Nuclear Explosives," T. R. Butkovich et al., National Technical Information Center, Nat. Bur. Stds., U. S. Department of Commerce, Virginia 22151. A formula for estimating the radius of the cavity formed is as follows:

$$Rc = C\ Y^{1/3}/(\rho h)^{1/4}\ \text{wherein}$$

$C$ is a constant dependent on rock type and for granite averages about 59.

$Y$ is the explosive yield in kilotons feasible, $\rho$ is the average density of the overburden $h$ is the depth of burial (D.O.B.) in meters (c.f. Teller et al., pp. 129 et seq.)

A fractured rock zone 27 surrounding the cavity and chimney may comprise relatively open shear fractures near the cavity wall and relatively closed radial fractures outwardly therefrom.

To adapt the chimney 21 for operation in accordance with the invention, there is provided a reaction product discharge conduit 28 communicating with the void space 29 in the upper portion of the chimney and extending to the surface. Such a conduit 28 may comprise the casing used in emplacing the nuclear explosive in the event that collapse thereof during the explosion is avoided or it may comprise a casing in a newly drilled well bore cemented and sealed in place. A similar reactant input conduit 31 may be disposed in a borehole drilled from an offset position and whipstocked to enter the chimney wall 24 at a low position or an upper portion of the cavity having adequate porosity to assure free ingress of the reactants. In general, the reactants will be introduced so as to contact the rock rubble in the chimney. For continuous operation the reactants may generally be introduced at lower chimney or upper cavity locations to flow upwardly through the rubble zone 26 and be discharged through conduit 28. For a batchwise operation only one conduit need be used with reactants being pumped into the chimney to contact the heated rubble and products then being exhausted or pumped therefrom. Products could also be recovered, e.g., by entrainment with steam or inert carrier gas injected through conduit 31 or steam distilled by adding regulated amounts of water to the cavity.

While reference has been made to the use of a single explosive device to create the nuclear chimney, it may be noted that a plurality of devices may be emplaced and detonated, for example, using techniques generally as disclosed in the copending application of Milo D. Nordyke for "Nuclear Explosive Method for Stimulating Hydrocarbon Production from Petroliferous Formations," Ser. No. 89,889(70) filed Nov. 16, 1970, now U.S. Pat. No. 3,688,843, issued Sept. 5, 1972. More specifically, nuclear explosives may be emplaced sequentially or simultaneously in horizontally or vertically spaced positions and be detonated either simultaneously or sequentially with spacings that assure merging of the cavity and chimney void spaces as well as to assure mixing of melted cavity material with the rubble produced in the explosion. Spacings appropriate for such array would generally be of the order of greater than, 1 Rc, to about, 2 Rc, between shot points for the horizontal case and for vertically spaced explosives fired simultaneously. With sequentially fired explosives a spacing of about, 2 Rc, horizontally may be used as well as in the case where the explosives are fired sequentially downward. Where they are fired sequentially upward a spacing of greater than about 2 Rc is required to accommodate the intervening chimney space. Sequential firing permits use of total explosive yields in excess of seismic hazard limits with each explosive yield being as large as the seismic limit. In other instances a second nuclear explosive may be emplaced in the upper chimnay void space or upper regions of the rubble zone, and detonated. In this event contamination may reach a high level. However, this procedure may be used to provide highly radioactive surfaces on the chimney contents, for example, to serve as a catalyst as well as to increase temperature. The total yield which is employed will be determined by the temperature and amount of heat required over the desired period of operation and may range from a few kilotons, e.g., 25 kilotons to many megatons which may be provided progressively over an extended period of time to maintain operating temperatures.

The temperature increase produced within such cavities can be determined approximately from the total explosive yield and volume of rock which is heated. The volume of rock is determined principally by the depth of burial, explosive yield and rock type. One kiloton explosive yield is equivalent to $10^{12}$ calories. Data for estimating tonnages of granite rock broken, chimney size, sieve size and the like for various yield and depths, are disclosed, for example, beginning at page 247 of Teller et al. Published thermodynamic properties of rock constituents can be used to determine the temperature of the rock as related to the energy supplied by the detonation.

Moreover, American and French tests with nuclear explosives in granite at depths of a few hundred meters give similar distributions of temperature in the cavity and chimney regions. The cavity, after an interval of a few months, attains a nearly isothermal maximum temperature zone with an approximate steady state temperature of 850° K over a volume of about one-half of a cavity volume. In the American tests this region of high temperature has been found to be approximated by a spherical segment near the bottom of the cavity, while in the French tests the region is nearly spherical and located near the center of the cavity. In either case the temperature drops off rapidly in all directions. The chimney region after a few months is at ~ 350° K, and is increasing in temperature at a rate of about 5°–10° K per month. Heat transfer from the cavity to the chimney is by convection of the residual cavity gases which consist primarily of steam at pressures of the order of tens of atmospheres. Permeability of the chimney region is high. For the cavity region the permeability is low relative to the chimney, but is not negligible as evidenced by the slow transfer of heat to the chimney.

The cavity material is observed to be a mixture of 30-40 percent frozen melt and 60-70 percent rubble. The frozen melt is primarily in the form of various types of lava, ranging from glasses to low density pumices. Much of the rubble in the cavity region has undergone intermediate stages of heating, as evidenced by decomposition of micas and partial melting.

Figure 2:
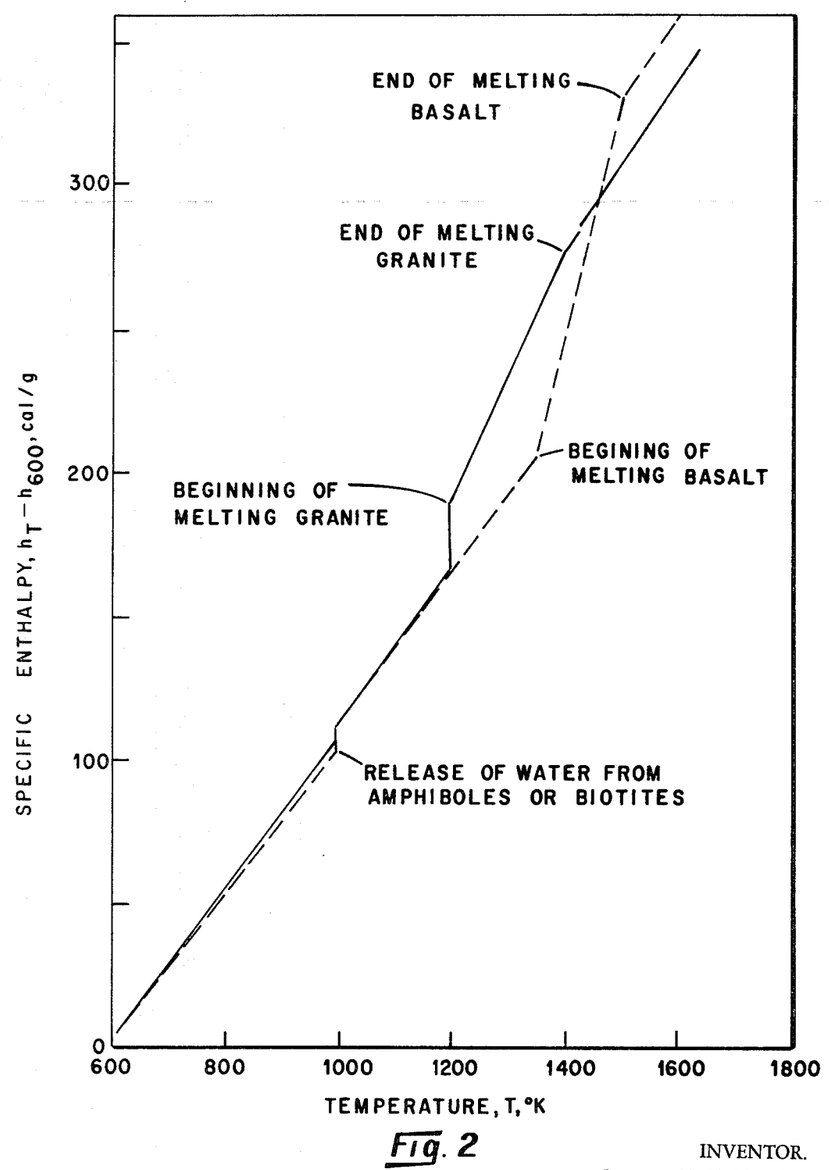
FIG. 2 is a graphical illustration of the specific enthalpy for typical granite and basalt from 600° K to about 1,600° K.

Calculated Enthalpy increments for a typical granite and a basalt from room temperature to the completely molten state (see Table I and FIG. 2). Temperatures for the beginning and completion of melting were estimated from available phase diagrams. The energy required to heat granit from room temperature to complete melting at 1,400° K is found to be 344 cal/g and the energy required for the observed steady state temperature of ~ 850° K in the cavity is 132 cal/g. Ignoring heat losses from the cavity and assuming the melt energy to be distributed uniformly between an initial melt at 1,400° K and room temperature rubble would require a melt fraction of 0.38 over a region of 0.5 of a cavity volume in order to attain the steady state condition. The existence of a geothermal temperature gradient outwardly from the zone heated by the detonation will serve to reduce heat flow and reduce heat loss to the formation. Higher temperatures will accordingly exist and persist for longer times then in a non-geothermal formation.

TABLE I

| T, °K | $h_t°-h_{298}°$, cal/g Granite | Basalt | T, °K | $h_t°-h_{298}°$, cal/g Granite | Basalt |
|---|---|---|---|---|---|
| 298 | 0.0 | 0.0 | 1200(c) | 232.0 | 229.4 |
| 400 | 20.0 | 19.6 | 1200(d) | 255.4 | 229.4 |
| 600 | 66.3 | 64.7 | 1350(e) | 321.2 | 270.7 |
| 800 | 118.4 | 114.8 | 1400(f) | 343.7 | 312.7 |
| 1000(a) | 174.0 | 167.6 | 1500(g) | 372.0 | 394.9 |
| 1000(b) | 176.6 | 175.1 | 1600 | 401.3 | 423.6 | a. Assumes no decomposition of hydrated minerals.
b. After decomposition of hydrated minerals.
c. Beginning of melting of granite. Approximately ½ of granite is assumed to melt completely at this temperature.
d. After melting of ½ of granite.
e. Beginning of melting of basalt.
f. Completion of melting of granite.
g. Completion of melting of basalt.

As an example as to how the temperature in a geothermal nuclear chimney reaction vessel may be determined, assume, that a geothermal gradient of 100° K/kilometer exists. (Any other actual temperature gradient may be used similarly.) The variation in chimney volume with variation in depth must be taken into account. To extrapolate from the foregoing results obtained in granite (shot depths less than 400 meter to depths of about 5,000 meters) requires the use of a scaling law such as the following:

$$R = C\ Y^{1/3}/(\rho h)^{1/4}$$

where:
$R$ = Cavity radius in meters
$C$ = Empirical constant ($C = 59$ for granite)
$Y$ = Device yield in kilotons
$\rho$ = Average density of overburden rock in g/cm³
$h$ = Depth of burial in meters From this scaling relation, the cavity volume for a given yield is calculated to decrease by a factor of 3 in going from 300 meters to 1,500 meters, and by a factor of 6 in going from 300 to 3,000 meters. Because of the contracted cavity volumes at these greater depths, the specific energies (cal/g) deposited in both cavity and chimney will be correspondingly greater. Since the temperature rise in the chimney is about 45° C after several months for near-surface events, the expected temperature rise at 1,500 meters is calculated to be 3 × 45° C = 135° C (the factor 3 accounts for the 3-fold increase in specific energy deposited at 1,500 meters). Adding this temperature rise to an assume ambient geothermal temperature of 175° C gives an expected chimney temperature of 135° + 175° = 310° C at a depth of 1,500 meters. A similar calculation for a depth of 3,000 meters (assuming ambient geothermal temperature = 325° C) gives an expected chimney temperature of 600° C.

More particularly, for a given yield, the energy deposited in the cavity will remain constant with depth, but because of the contracted cavity volumes at greater depths, the specific energies deposited will increase. Compared to a specific energy of 132 cal/g at 300 meters, approximately 3 × 132 cal/g = 396 cal/g is expected in the hottest part of the cavity at 1,500 meters and 6 × 132 cal/g = 792 cal/g at 3,000 meters, and proportionately greater at greater depths.

Assuming ambient geothermal temperatures of 150° C at 1,500 meters, and 300° C at 3,000 meters, the energies required for complete fusion are estimated to be 312 and 277 cal/g at the respective depths for granite, and 364 and 330 cal/g for basalt (see Table II). Thus, the specific energy in the hot part of the cavity exceeds the energy required for complete fusion of either granite or basalt. If the total volume of molten rock is the same as that in near-surface shots, then for granite at 1,500 meters it would be (0.38)(0.5)(3) = 0.57 of a cavity volume, where 0.38 represents the estimated fraction of melt over 0.5 cavity volume for a 400 meter shot depth. At 3,000 meters depth, the volume of molten rock is approximately (0.38)(0.5)(6) = 1.14 cavity volumes. About 50 percent of additional mass of ambient rock, e.g., rubble would have to be added to these melts to lower their temperatures below the freezing point. If mixing of the melt with chimney rubble is insufficient to freeze the melt, the cavity will be expected to retain molten rock over a period of months as dissipation of the energy by thermal conduction is a slow process.

Not only will the specific energy be higher in the cavity region, but also in the chimney region in explosions at greater depths. The temperature rise in the chimney is about 50° C after several months for near-surface events. Because of the contracted volumes at greater depths, the temperature rise at 1,500 meters, for example, is predicted to be $3 \times 50°C = 150°C$, and at 3,000 meters, 300° C. The respective chimney temperatures would therefore be expected to be about $\sim 300°$ C and $\sim 600°$ C at the two depths.

An even greater temperature increase will be obtained in the chimney by using a multiple array of explosives detonated as described above. If a simple vertical chain of explosives is used, with the spacing indicated above, a continuous chimney would be expected to form which should show a greater extent of mixing of molten rock with rubble, and an enhanced permeability. Taking the resultant chimney volume to be four times the sum of the cavity volumes, the additional specific energy deposited in the chimney by molten rock is estimated to be $(0.57)(396 \text{ cal/g})(\frac{1}{4}) = 56$ cal/g, which when added to the energy needed to give a temperature of $\sim 300°$ C in the single explosive case, gives a final chimney temperature of about 500°C (see FIG. 2). Temperatures in the range of upwardly from about 150° C to about 700° C may then be obtained at depths of 300 meters to about 6,000 meters for the given case with even higher temperatures at greater depths.

Such temperatures are appropriate for conducting wide variety of chemical process reactions. For purposes of illustration, reference will now be made to the synthesis of ammonia in such a geothermal nuclear chimney. Extensive summaries relating to ammonia synthesis are set forth in "Encyclopedia of Chemical Technology," Interscience Publishing Company, Volume 1, first Edition and in Volume 2, second Edition. To achieve acceptable conversions of a mixture of 3 parts hydrogen to 1 part nitrogen an effective catalyst should generally be present. The catalyst need not necessarily be one which promotes a rapid transformation since a large reaction volume is available so that contact times much longer than would be economic in conventional practice may be used to offset a slower reaction rate.

It is probable that the surfaces of the chimney contents may exert a catalytic effect especially in the presence of a high radiation level emitted by fission products trapped in cavity contents and in the chimney.

Radiation induced catalysis for a variety of reactions which have been studied may occur in the gas phase reactions and in the gas-surface reactions of interest here. Gamma radiation is especially effective because of its penetrating power. In gas phase reactions, radiation serves mainly to create activated species such as radicals and free ions which can then interact to form products. The efficiency of such reactions is measured by G, the molecules of product per 100 eV absorbed. G is of the order of unity for most simple preparative reactions. Radiation induced catalysis for gas-surface reactions would be expected to depend upon radiation damage effects in the rocks. Radioactive products such as $Cs^{137}$, $Ru^{103}$, $Ru^{106}$, and $Sb^{125}$ are commonly found distributed throughout the chimney region and can cause such damage. Furthermore, these radio-nuclides tend to concentrate in the smaller particles and rock surfaces, and enhance the radiation in these high surface area regions. The reactivity of the surface of an irradiated material for catalysis or absorption reactions is associated in many cases with specific radiation produced defects. These defects in many instances greatly alter the behavior of a surface. For example, silica gel, which ordinarily does not absorb hydrogen will, after irradiation treatment, readily absorb a surface layer of hydrogen. It is probable that other materials brought into contact with hydrogen at such a surface may well undergo catalytic transformation. Moreover, hydrocarbons may well be dehydrogenated, isomerized or polymerized at such a surface.

Moreover, the rock may contain significant quantities of iron compounds, together with iron from emplacement components in amounts of about 50 to 100 tons or more, per device, which may be distributed throughout the cavity and chimney contents. Table II sets forth the iron content of various rock types.

TABLE II

| | | Iron content wt./% | | | | | |
|---|---|---|---|---|---|---|---|
| Ultramafic rocks | Basalts | Intermed. rocks | Felsic granites, granodiorite | High Ca granites | Low Ca granites | Syenites | Clays and shales |
| 9.6 | 8.6 | 5.8 | 2.7 | 3.0 | 1.4 | 3.7 | 3.3 |

For the rocks to be effective as chemical catalysts, it is assumed that iron minerals in the rocks can be converted to metallic iron. The iron content of a rock will then be an important criterion in determining the potential of the rock as a catalyst. Granites are generally low in iron content, with values of about 2 wt % iron. Basalts and ultramafic rock are much more promising with iron contents of about 8–10 percent. Intermediate rocks, syenites, shales, and clays have iron contents of about 3–6 percent. Ultramafic rocks, per se, have the highest iron and the lowest trace element poison contents of the various rock types, and therefore should provide the most favorable medium. Basalts have nearly the same iron content as the ultramafic rocks, but have significantly more phosphorus, and somewhat more boron and arsenic which elements may serve as poisons to reduce efficacy as a catalyst. Intermediate rocks show lower iron contents and higher phosphorus, boron and arsenic than basalts. Granites are yet lower in iron than intermediate rocks, but are also lower in phosphorus and other trace element poisons. It would appear that basalts, per se, have an advantage over intermediate rocks and granites as a catalytic medium. However, the deficiency of iron may be overcome by depositing iron from iron carbonyl or other volatile iron compounds such as $FeCl_3$. Moreover, iron salt solutions or dispersions of iron or iron oxides could be introduced as by spraying to coat the rock rubble surfaces with the solvent or carrier phase being evaporated by additives required to produce singly promoted or doubly promoted catalysts may also be included in such agents. The doubly promoted iron catalysts known in the art include both an acidic or amphoteric oxide such as aluminum oxide, zirconium dioxide, silicon dioxide or titanium dioxide and an alkaline oxide, such as potassium oxide. Singly promoted catalysts generally include an acidic or amphoteric oxide. It may be noted that various of the promoter elements are present in trace to significant amounts in the stated rock types and may be available to promote iron present or introduced into the chimney.

Reduced iron catalysts or the usual catalytic compositions introduced to coat rubble surfaces should be active or activable in the customary manner. However, activation of rock constituents as a catalyst may require more vigorous conditions or longer times than a conventional catalyst since the iron is combined in a number of minerals. The chemical activity of iron oxides in these minerals probably does not differ greatly from unity, however, since the silicate mineral fayalite ($Fe_2SiO_4$) is known to have a free energy of formation from the oxides of only −5 kcal/mole in the vicinity of 500° C. At 150 atm hydrogen pressure, activation should occur at somewhat above 400° C. Reduction of iron oxides initially will occur to only a small distance below the rock surface. The reduction equilibria may be illustrated by the following reactions:

$$Fe_3O_4(s) + H_2(g) = 3FeO(s) + H_2O(g); K_{800} = 3.64$$

and $$FeO(s) + H_2(g) = Fe(s) + H_2O(g); K_{800} = 0.093$$

Thus, when the hydrogen pressure is 110 atm, the first reaction essentially goes to completion, and for the second reaction, $pH_2^0 = (0.093)(110) = 10$ atm.

An estimate of the amount of iron oxides that will be reduced can be made as follows. A vertical array of five explosives with a yield of 40 kt each at an average depth of 1,500 meters is assumed. From the scaling law equation, the volume of each cavity is 75,000 m³, and assuming the total chimney volume to be four times the sum of the cavity volumes, gives a total chimney volume of $1.5 \times 10^6$ m³. If only the iron oxides contained within ⅛" (0.32 cm) of the rock surfaces are reduced by hydrogen, it is found from published rubble size distribution data that this surface material represents 20 percent of the rubble mass. The amount of iron oxide in this surface layer is ~ 10⁵ tons for a basalt and requires 2,500 tons ($10^9$ ft³ at S.I.P.) of hydrogen to reduce it to metal. Reduction of only a small portion of this iron oxide would probably suffice to initiate catalytic activity. Reduction would be expected to occur gradually over a long period of time, thus continuously generating fresh catalyst as older portions of the catalyst lose activity.

For utilizing the geothermal nuclear cavity-chimney vessel structure provided as described above, a facility (not shown) is provided at the surface suitable for preparing the reagents, for injecting the reagents into the chimney, for withdrawing reaction products, for separating desired products from the reaction mixture, for recycling unused materials and the like generally in accord with conventional practice. Conventional plant arrangements may be used with the nuclear chimney vessel being substituted for the conventional reactor.

For synthesizing ammonia, plant arrangements similar to those disclosed in the aforesaid "Encyclopedia" or elsewheer may be used. There generally includes means for producing purified hydrogen and nitrogen and for supplying a mixture of about 3 parts by volume of hydrogen with 1 part by volume of nitrogen at the desired operating pressure usually in the range of about 100 to 1000 atmospheres. With promoted and doubly promoted iron catalysts operating pressures of the order of 200 to 250 atmospheres are common. The indicated reagents are introduced into the chimney through conduit 31 after the catalyst has been activated with hydrogen as described above. The chimney should be created in such a manner that rock rubble chimney and cavity contents, with which the reaction mixture comes into contact, provide a temperature above 300° C and preferably in the range of about 500° to about 700° C which is generally required for conversion at reasonable rates. Following passage of the reaction mixture through the reaction zone provided by the aforesaid rubble the product is withdrawn through conduit 28 for processing in the aforesaid surface facility. While a continuous procedure has been described, a batchwise operation can be conducted by introducing the reagent mixture through a single conduit, either 31 or 28, with the other being closed off and allowing the reagents to remain in contact with the catalytic surfaces until equilibrium is approached and then withdrawing the reaction mixture for treatment as above.

Figure 3:
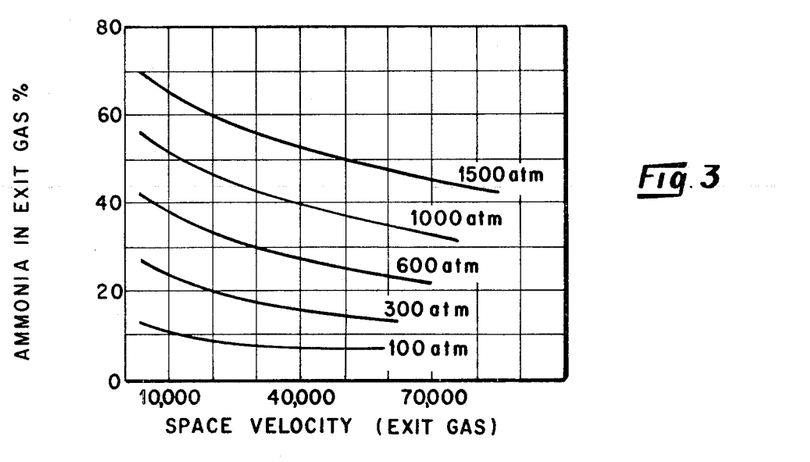
FIG. 3 is a graphical representation of the percentage of ammonia appearing in a reactor exit gas as a function of space velocity for a typical doubly promoted catalyst at various operating pressures.
Figure 4:
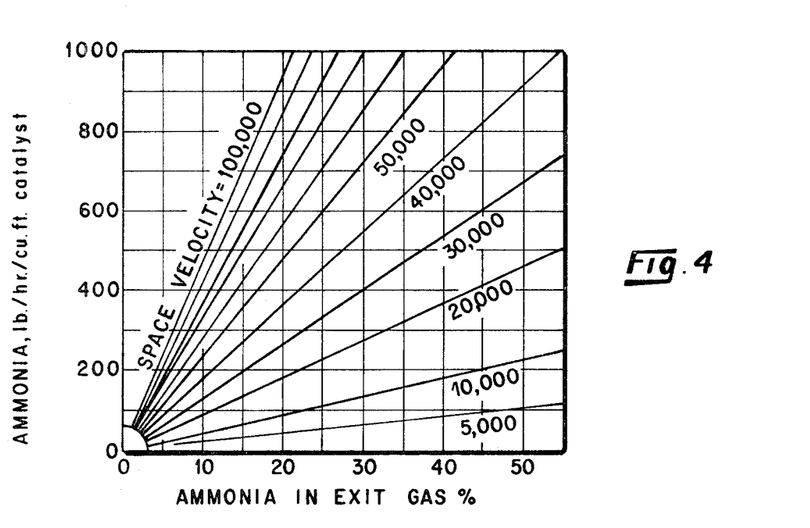
FIG. 4 is a graphical representation of the space time yield of ammonia in exit gas as a function of ammonia yield in pounds/hour/cubic feet of catalyst based on the data shown in FIG. 3.

Further details of the inter-relationship of certain operating conditions relevant to the production of ammonia are shown in FIGS. 3 and 4 of the drawing, which Figures are derived from page 787, Volume 1, of the aforesaid "encyclopedia" first Edition. These curves are based on data obtained at the Fixed Nitrogen Research Laboratory on a doubly promoted iron catalyst operating at 475° C but are indicative of relative effects for other temperatures and catalysts, i.e., the general shape and relationship of the curves would be similar although displaced somewhat. In commercial practice a space velocity of 100,000 indicates that 5 times as much ammonia is produced than at 20,000; however, the ammonia content in the exit gas decreases at the higher value while circulation and ammonia recovery costs increase so that a compromise space velocity value in the range of between 20,000 and 40,000 (liters of gas per liter of catalyst) is generally used commercially. Due to the large cross section of the chimney reaction space, space velocities herein will generally be much lower, e.g., by a factor of the order of $10^4$ to $10^5$ than those which are required in commercial practice.

It will be noted from FIG. 4 that the percentage of ammonia in the exit gas increases as the space velocity is decreased. With the large reaction volume provided by the geothermal chimney reaction vessel such drastically lower space velocities can therefore be utilized to increase the percentage ammonia yield, e.g., to offset slower reaction rates if provided by the catalytic system in the chimney.

Moreover, it may be noted that the conversion of hydrogen and nitrogen to form ammonia is an exothermic reaction with a heat output of 11,800 calories/mole. Therefore, by judiciously regulating the space velocity and operating pressure to obtain the requisite conversion percentage, net heating, neutral or cooling heat exchange effects can be obtained in the rubble zone. Ordinarily, if conversion percentage is low, i.e., below about 20 percent, the reaction products absorb heat from the rubble zone. If above such percentage, heating of the rubble zone may be effected. This effect may be used to maintain or increase the operating temperature if desired. In usual practice, it is contemplated that an explosive yield will be used such that an excess of heat is deposited in the cavity so that heat flow from the cavity into the rubble zone permits operation with a lower conversion percentage so that some of the nuclear detonation heat energy and geothermal thermal energy is carried away by the reaction products. This energy may then be utilized in a heat exchanger or gas turbine arrangement to generate electrical power, drive compressors, supply process heat in the surface facilities or otherwise as desired.

Further details of the process of the invention will be set forth in the following illustrative examples:

EXAMPLES

Total explosive yield 200 kilotons to 1 megaton in 4 or more equivalent size detonations. Geothermal temperature ~ 200°–250° C. Depth of Burial 2,600 meters.
Spacing ~ 2 Rc vertically.
Chimney temperature 500° C.
Gas inlet temperature ~ 200° C.
Synthesis gas input ($3H_2/N_2$) 4,300 tons/day
Yield at 200 atmospheres ~ 14% (600 tons/day)
Gas outlet temperature ~ 500° C.

Heat output from chimney 16,400 cal/mole comprised of 11,800 cal/mole exothermic heat of reaction and 4,600 cal/mole from chimney rock. This corresponds to a heat removal of $5.4 \times 10^{13}$ cal/year which is equivalent in energy to 54 kilotons (TNT equivalent) of nuclear yield.

If the heat output is used for generation of electricity by using an appropriate heat exchanger and a steam turbine power generator, 10 MW of power could be generated based on an efficiency of 20 percent. This power would be sufficient to provide for ~ 25 percent of the electrical power requirements of the 600 ton/day ammonia plant. This heat is also available to satisfy process heat requirements.

By increasing the operating pressure to about 300 atmospheres the net removal of heat is reduced to approximately zero with a consequent increase in operating temperature with corresponding yields of about 20 percent ammonia by volume.

Various other chemical process reactions, such as those set forth hereinafter, may also be conducted in a geothermal nuclear chimney reaction chamber.

1. Ammonium carbamate used in the production of urea is prepared by the following reaction:

$$CO_2 + NH_4CO_2NH_2 \quad \Delta H = -67{,}000 \text{ BTU/lb-mole.}$$

$NH_3$ in a molar excess of 3.5:1 with gaseous $CO_2$ and recycle carbamate in just enough water to dissolve all unreacted $CO_2$ as carbonate is introduced into the reactor at about 3,200 psi ( ~ 220 atmospheres) and with a temperature of ~ 366 to 380° F (~ 300° C). The reaction mixture fluid is withdrawn and the carbamate may then be converted to urea in a surface facility by conventional procedures.

2. HCN may be produced by the reaction $$2NH_3 + 3O_2 + 2CH_4 \rightarrow 2HCN + 6 H_2O$$

at about 1,000° C in the absence of a catalyst but possibly at a lower temperature in the presence of the catalytic surfaces in the chimney.

3. The synthesis of methanol from $CO + H_2$ is carried out at 200 atm and 600° K in the presence of a catalyst such as $ZnO + 10$ percent $Cr_2O_3$.

4. Various petroleum refining and petrochemical operations such as stripping or distillation, cracking, isomerization, oxidation, chlorination and others may be conducted using process pressures and temperature conditions provided in the geothermal reaction vessel which may be of analogous magnitudes to those known in the art. In many instances milder conditions may be used due to long contact times, catalytic effects and other attendant on use of a nuclear geothermal reaction vessel.

While the description has made reference to gaseous reactants introduced simultaneously, it is contemplated that a single reactant or a reactant mixture may be introduced to contact a solid or fluid reagent added previously or vice versa. Moreover, reactants may be introduced in a fluid or gaseous state, for example, to react with constitutents present in the formation rock. Also, one reaction vessel provided as above may be employed separately to provide process heat for producing desired reactants for use in a second geothermal reaction vessel or for purifying reaction products by procedures analogous to distillation, reforming or the like. For example, the first vessel could be used for preheating reaction mixtures supplied to the surface facilities. Counter current heat exchange between reaction products and reactants may be used to maintain or regulate operating temperatures in the reaction vessel. With the large amount of heat available, it is considered feasible for example, to retort or destructively distill industrial and municipal wastes, forest, fossil fuels, etc., to produce heating gas, chemical products and to provide residues such as carbon or coke which can in turn be used in the reactant synthesis plant or for other purposes. While reference has been made to conducting the reactions in situ within the vessel, it would be possible to preheat reagent mixtures in the vessel and withdraw the preheated and perhaps partially reacted mixture to the surface for passage through surface reactors to complete the reaction. Supplemental heating can be used therein, for example, to attain higher temperatures which may be needed, for example, in the cracking of hydrocarbons ($CH_4$) to obtain hydrogen, to promote the water gas reaction, etc. Accordingly, it may be seen that a process reaction vessel of great versatility and utility has been provided.

While there has been described in the foregoing what may be considered to be preferred embodiments, modifications may be made therein without departing from the teachings of the invention and it is intended to cover all such as fall within the scope of the appended claims.

I claim:

1. In a method for conducting a chemical process wherein elevated operating temperatures are required to induce a reaction between components of a reaction mixture in a nuclear chimney, the steps comprising:
selecting a relatively impervious fracture free subterranean geothermal formation having a site therein with a temperature below said elevated process operating temperature;
emplacing and detonating at least one nuclear explosive device at said site in said subterranean geothermal formation to create therein a closed reaction vessel comprising the explosion cavity together with an associated chimney portion extending upwardly therefrom, said cavity and chimney portion having a fragmented rock rubble zone disposed therein, the total detonation yield of said nuclear explosive and emplacement depth being correlated to provide sufficient heat to raise the temperature of said fragmented rubble zone to achieve said elevated process operating temperature, said chimney rubble zone of the reaction vessel being heated to a temperature above that of said geothermal formation by energy supplied by detonation of said nuclear explosive device; and providing reagent introduction and product withdrawal means including at least one conduit communicating with said vessel and extending to the surface for introducing reagents into said vessel into contact with said rubble zone to be heated and reacted to produce a reaction mixture and for withdrawing said reaction mixture to the surface, said reagent introduction and product withdrawal means comprising a first conduit communicating with lower chimney and upper cavity portions for introducing reagents to flow upwardly to contact the surfaces of said rubble zone to be heated and reacted therein and a second conduit communicating with upper portions of said vessel for withdrawing the reaction product mixture therefrom, a catalyst being provided on the surfaces of the fragmented rock of said fragmented rock rubble zone, which catalyst is effective to promote the reaction between said reagents, the temperature of said fragmented rock rubble zone being in the range of about 300° C to 700° C, wherein said catalyst comprises iron, an agent which is effective to promote a reaction between nitrogen and hydrogen, wherein said reagents are a synthesis gas mixture of $H_2$ and $N_2$, at a pressure of above about 100 atmospheres, and the reagents are introduced through said first conduit so that ammonia is produced in the reaction mixture on contact with the surfaces of said fragmented rock of said fragmented rock rubble zone, and wherein said reaction mixture comprising the ammonia is withdrawn through said second conduit.

2. A process as defined in claim 1 further characterized in that said site in the geothermal formation is situated in a silicate rock portion of said formation.

3. A process as defined in claim 2 further characterized in that a plurality of nuclear explosive devices are emplaced with a spacing such that the respective cavities and chimneys are interconnected to form said vessel with said fragmented rock rubble zone disposed therein.

4. A process as defined in claim 1 wherein said catalyst comprises radioactive residues deposited on the surfaces of said fragmented rock of said fragmented rock rubble zone.

5. A process as defined in claim 1 wherein said catalyst comprises a reduced iron catalyst.

6. A process as defined in claim 5 wherein the process of said gas mixture is in the range of about 100 to above about 400 atmospheres and said gas mixture is 3 parts by volume of $H_2$ and 1 part by volume of $N_2$.

7. A process as defined in claim 1 wherein said reagents introduced through said first conduit are maintained in contact with the surfaces of said fragmented rock of said fragmented rock rubble zone until equilibrium is approached and then the reaction mixture is withdrawn.

8. A process as defined in claim 1 further characterized in that the pressure of said reagents in said nuclear explosion cavity and chimney is sufficient to balance hydrostatic pressure in said formation to minimize ingress of water therein.

* * * * *